(No Model.)

C. D. PAGE.
HARNESS MOUNTING.

No. 265,699. Patented Oct. 10, 1882.

Attest:
Walter Fowler
Geo. R. Byington

Inventor;
Caleb D. Page
per attys
A. H. Evans & Co

UNITED STATES PATENT OFFICE.

CALEB D. PAGE, OF GREELEY, COLORADO.

HARNESS-MOUNTING.

SPECIFICATION forming part of Letters Patent No. 265,699, dated October 10, 1882.

Application filed July 31, 1882. (No model.)

*To all whom it may concern:*

Be it known that I, CALEB D. PAGE, of Greeley, in the county of Weld and State of Colorado, have invented certain new and useful Improvements in Harness-Mountings; and I hereby declare the following to be a full, clear, and exact description thereof, reference being had to the accompanying drawings, making part of this specification, in which—

Figure 1:
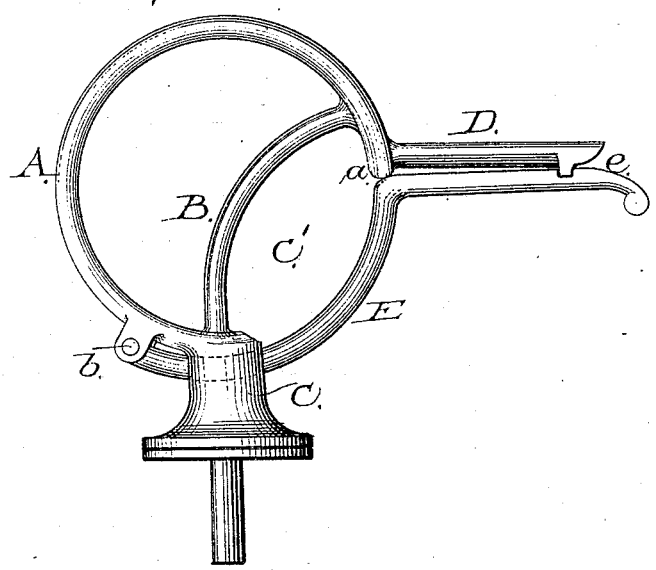
Figure 2:
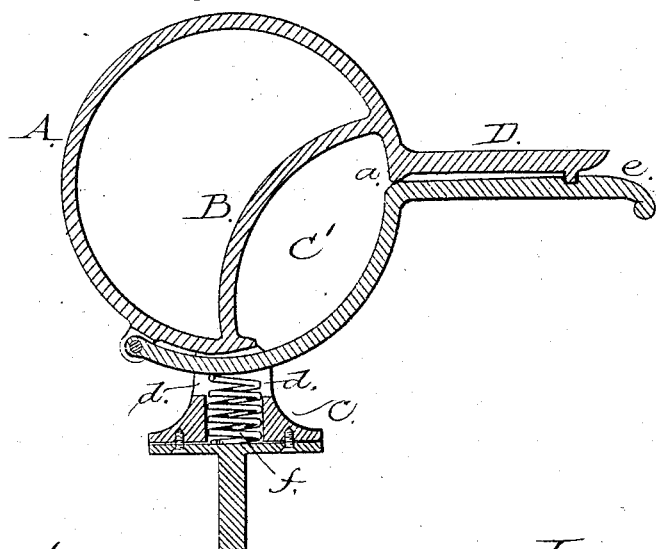

Figure 1 is a front elevation, showing my invention applied to a terret. Fig. 2 is a vertical sectional view of the same.

My invention relates to harness-mountings, and has for its object to provide a ready and easily-operated means for holding and supporting the ends of hitching-straps, folded lines, or other loose straps of harness when the harness is on the animal or when not in use.

My invention consists in certain details of construction, as hereinafter fully described, and specifically pointed out in the claims.

In order that those skilled in the art may make and use my invention, I will proceed to describe the manner in which I have carried it out.

In the drawings, for purposes of illustration, I have shown my device applied to a terret; and in the said drawings, A represents the ring of a terret, the circular portion of which terminates at $a$, and is sustained by a brace, B, rising from the center of the supporting-post C.

Projecting from the ring A is an arm, D, having a lower surface, either smooth, roughened, or longitudinally ribbed, as may be desired.

On the under side of the main portion of the terret-ring or other harness-mounting, at $b$, are ears, to which is pivoted the end of a curved spring clasping-bar, E, which passes through a slot, $d$, in the post C, and terminates in a thumb-piece and a clasping and holding piece, $e$, which is held against the face of projection or arm D by means of a stout coiled spring, $f$, contained within the post C. (See Fig. 2.)

It will be seen that by this construction I provide a space sufficiently large, C', between the brace B and the spring-bar E, into which may be passed and securely held the folded lines when not in use, or when the harness is being removed from the animal. This space will also be found useful for holding other loose straps connected with the harness, and avoid any necessity of their hanging about loose under the animal's feet.

A variety of changes may be made in the shapes of the pieces or holding-arms D and $e$— such as changing the character of the holding-surfaces to any desired configuration, or as changing the form of the thumb-piece or its width—without departing from the spirit of my invention, the essential element of which is a spring clasping-arm, in combination with the mountings of harness, for the purposes named.

Having thus described my invention, what I claim as new, and desire to secure by Letters Patent, is—

1. The terret-ring A, provided with the brace B and projecting jaw D, in combination with the pivoted spring-operated arm E, provided with the projecting jaw $e$, all constructed and arranged to operate substantially as and for the purpose set forth.

2. The sectional terret-ring A, provided with the brace B, and having the jaw D, in combination with the pivoted arm E, spring $f$, and projecting jaw $e$, all constructed and arranged substantially as set forth.

CALEB D. PAGE.

Witnesses:
ASA G. WHEAT,
JOS. W. FELTER.